(12) United States Patent
Gajdarus (10) Patent No.: US 11,519,791 B2
(45) Date of Patent: Dec. 6, 2022

(54) SEALING DEVICE FOR A COLD-END PART OF A THERMOCOUPLE WIRE ARRANGEMENT WITH A MINERAL-INSULATED CABLE AND THERMOCOUPLE

(71) Applicant: Vitesco Technologies GmbH, Hannover (DE)

(72) Inventor: Tomáš Gajdarus, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 261 days.

(21) Appl. No.: 16/771,540

(22) PCT Filed: Dec. 4, 2018

(86) PCT No.: PCT/EP2018/083536
§ 371 (c)(1),
(2) Date: Jun. 10, 2020

(87) PCT Pub. No.: WO2019/115298
PCT Pub. Date: Jun. 20, 2019

(65) Prior Publication Data
US 2020/0378840 A1    Dec. 3, 2020

(30) Foreign Application Priority Data

Dec. 12, 2017    (GB) .................................... 1720638

(51) Int. Cl.
*G01K 7/12*  (2006.01)
*G01K 1/08*  (2021.01)
(Continued)

(52) U.S. Cl.
CPC ................. *G01K 7/12* (2013.01); *G01K 1/08* (2013.01); *G01K 7/16* (2013.01); *G01K 7/34* (2013.01); *H02G 15/04* (2013.01)

(58) Field of Classification Search
USPC .................................................. 374/208, 179
See application file for complete search history.

(56) References Cited

U.S. PATENT DOCUMENTS 3,964,314 A    6/1976  Brixy ............................ 374/175
4,627,744 A    12/1986 Brixy ............................ 374/175
(Continued)

FOREIGN PATENT DOCUMENTS

DE    19509132          9/1996  ............. C03C 3/072
DE    19654464 A1 *     7/1998  ......... G01N 27/4077
(Continued)

OTHER PUBLICATIONS

Search Report for International Application No. PCT/EP2018/083536, 12 pages, dated Mar. 7, 2019.
(Continued)

*Primary Examiner* — Mirellys Jagan
(74) *Attorney, Agent, or Firm* — Slayden Grubert Beard PLLC (57) ABSTRACT

Various embodiments of the teachings herein include a sealing device for sealing a cold-end part of a thermocouple wire arrangement based on a mineral-insulated cable, the sealing device comprising: a sealing element including an electrically insulating material, the sealing element defining a through-hole for passing through a respective thermocouple wire of the mineral-insulated cable; a sealing ring arranged at an outer rim of the sealing element for fixing the sealing device to a sheath or a support tube of the mineral-insulated cable; and an electric temperature sensing element
(Continued)

for sensing an absolute temperature of the cold-end part. The temperature sensing element has at least one temperature-dependent electrical property.

14 Claims, 7 Drawing Sheets

(51) Int. Cl.
*G01K 7/16* (2006.01)
*G01K 7/34* (2006.01)
*H02G 15/04* (2006.01)

(56) References Cited

U.S. PATENT DOCUMENTS

| | | | | |
|---|---|---|---|---|
| 5,137,582 | A | 8/1992 | Kasman | 136/233 |
| 5,917,150 | A * | 6/1999 | Hampton | H01B 7/16 |
| | | | | 174/50.56 |
| 6,102,565 | A | 8/2000 | Kita | 374/179 |
| 6,229,093 | B1 | 5/2001 | Hafele | 174/122 G |
| 2011/0056926 | A1 | 3/2011 | Coursey | 219/490 |
| 2013/0227304 | A1 | 8/2013 | Suenag | G06F 21/60 |
| 2020/0003630 | A1 * | 1/2020 | Kitching | G01K 7/22 |

FOREIGN PATENT DOCUMENTS

| | | | | |
|---|---|---|---|---|
| GB | 1138337 | | 1/1969 | H02G 15/10 |
| GB | 1252754 | | 11/1971 | H01V 1/04 |
| GB | 1351749 | A * | 5/1974 | H02G 15/04 |
| GB | 1448709 | | 9/1976 | H01C 7/00 |
| GB | 1546883 | | 5/1979 | H02G 15/04 |
| GB | 1546883 | A * | 5/1979 | H02G 15/04 |
| GB | 2215921 | | 9/1989 | H02G 15/04 |
| GB | 2227617 | | 8/1990 | H02G 15/04 |
| GB | 2554353 | | 4/2018 | H02G 15/04 |
| JP | 5569821 | | 9/2013 | G06F 21/62 |
| WO | 2016/045692 | | 3/2016 | H02G 15/02 |
| WO | 2017/103470 | | 6/2017 | G01K 1/08 |

OTHER PUBLICATIONS

Search Report for GB Application No. 1720638.4, 6 pages, dated Jun. 13, 2018.

* cited by examiner ically relates to cable. Various embodiments of the teachings herein include sealing devices for sealing a mineral-insulated cable used for sensing a temperature. The sealing device can seal a space between an outer sheath of the cable and a wire arranged inside the outer sheath. Various embodiments include thermocouple temperature sensing devices.

SEALING DEVICE FOR A COLD-END PART OF A THERMOCOUPLE WIRE ARRANGEMENT WITH A MINERAL-INSULATED CABLE AND THERMOCOUPLE

CROSS-REFERENCE TO RELATED APPLICATIONS

This application is a U.S. National Stage Application of International Application No. PCT/EP2018/083536 filed Dec. 4, 2018, which designates the United States of America, and claims priority to GB Application No. 1720638.4 filed Dec. 12, 2017, the contents of which are hereby incorporated by reference in their entirety.

TECHNICAL FIELD

The present disclosure relates to cable. Various embodiments of the teachings herein include sealing devices for sealing a mineral-insulated cable used for sensing a temperature. The sealing device can seal a space between an outer sheath of the cable and a wire arranged inside the outer sheath. Various embodiments include thermocouple temperature sensing devices.

BACKGROUND

A mineral-insulated cable (MIC) is an electric cable with an outer sheath that can be of tubular shape and that can be made of metal or an alloy. Inside the outer sheath at least one electrically conductive wire can be arranged and the space between the at least one wire and the outer sheath is filled with an electrically insulating mineral, like e.g. magnesium oxide powder or aluminum oxide. The insulating mineral can be a powder.

A mineral-insulated cable can be designed as a thermocouple cable by the choice of the material of the conductive wires inside the sheath and/or the outer sheath itself. One possible thermocouple includes two wires comprising different nickel alloys, e.g. Nicrosil (NiCrSi) and Nisil (NiSi). At one end of the mineral-insulated cable the two ends of the wires are electrically connected. This is the sensing end or hot end or hot-end part. At the other end of the mineral-insulated cable, the so-called cold end or cold-end part, the two wires must be connected to a measuring circuit in order to determine an electromagnetic force emf or an electric voltage that is generated by the thermocouple due to a temperature difference between the hot-end part and the cold-end part. In other words, a relative temperature difference may be measured this way. For obtaining the absolute temperature of the hot-end part, the absolute temperature of the cold-end part must be known. Alternatively, the thermocouple wires of the mineral-insulated cable may be extended by means of a special thermocouple extension cable that also provides thermocouple properties. This allows for placing the temperature sensor for measuring an absolute temperature value away from the colt-end part onto a printed circuit board (PCB) of the measuring circuit. However, such an extension cable is expensive.

After cutting a mineral-insulated cable into length, the open ends of this cable must be sealed in order to keep the mineral powder inside the sheath and to prevent humidity from intruding the cable. Such a sealed mineral-insulated cable is described in U.S. Pat. No. 6,229,093 B1, wherein the sealing of the cold end of the sheath of the cable comprises a liquid-tight sleeve for each wire projecting out of the sheath of the cable. However, for providing such sleeves, a sealing material must be applied to the wires and cured in order to seal the space between the wires and the sleeve. As sealing material, glass or epoxy raising or spinel is used. This requires the placing of the loose sealing material at the end of the mineral-insulated cable and curing the sealing material together with the end of the mineral-insulated cable which is a complex process. Further sealing devices for mineral-insulated cables are described in GB 1546883 A and GB 2227617 A.

U.S. Pat. No. 4,627,744 A describes a thermocouple temperature sensor that is based on a mineral-insulated cable which in turn provides an electric resistor at the hot-end part of the mineral-insulated cable. A thermal noise of this resistor is used to calibrate the thermocouple-based temperature measurement. For increasing the mechanical stability, a mineral-insulated cable may be arranged inside a support tube. Such a support tube may be a metal tube, e.g. a steel tube.

SUMMARY

The teachings of the present disclosure describe measurement of an absolute temperature value on the basis of a thermocouple that is provided in the form of a mineral-insulated cable. As an example, some embodiments of the teachings herein include a sealing device (16) for sealing a cold-end part (13) of a thermocouple wire arrangement that is based on a mineral-insulated cable (10), the sealing device (16) comprising a sealing element (17) made of or containing an electrically insulating material, wherein the sealing element (17) comprises a respective through-hole (18) for passing through a respective thermocouple wire (12) of the mineral-insulated cable (10) and wherein a sealing ring (23) is arranged at an outer rim (22) of the sealing element (17) for fixing the sealing device (16) to a sheath (11) or a support tube (31) of the mineral-insulated cable, characterized in that the sealing device (16) comprises an electric temperature sensing element (T) for sensing an absolute temperature of the cold-end part (13), wherein the temperature sensing element (T) comprises an electrical property that is temperature-dependent.

In some embodiments, the temperature sensing element (T) comprises a resistance sensor.

In some embodiments, the temperature sensing element (T) comprises an inductive temperature sensor and/or a capacitive temperature sensor.

In some embodiments, the temperature sensing element (T) is integrated into the sealing element.

In some embodiments, the temperature sensing element (T) is attached to the sealing element.

In some embodiments, the temperature sensing element (T) comprises to electrical contacts (35) and wherein one of the contacts (35) is electrically connectable to one of the thermocouple wires (12) of the mineral-insulated cable (10) and the other contact (35) is electrically connected to one separate electrical connecting element (37) that is different from any of the thermocouple wires (12) of the mineral-insulated cable (10).

In some embodiments, a connecting element (41) for connecting one of the thermocouple wires (12) of the mineral-insulated cable (10) to an electronic measuring circuit (33) is connected (43) to the thermocouple wire (12) over the sensor element (T).

In some embodiments, the temperature sensing element (T) comprises to electrical contacts (35) and wherein the temperature sensing element (T) is connected to a four-wire connection (34) which provides two wires (36, 37) per electrical contact (35) of the temperature sensing element (T).

In some embodiments, the electrically insulating material is glass or ceramics.

In some embodiments, the sealing element (17) provides sealing areas (21, 30) in each through-hole (18) and at the sealing ring (23) for hermetically sealing the mineral-insulated cable (10) by soldering or welding the sealing device (16) to the thermocouple wires (12) and the sheath (11) or the support tube (31) of the mineral-insulated cable (10), wherein the sealing areas (21, 30) provide a surface comprising a metal or an alloy.

As another example, some embodiments include a thermocouple temperature sensing device comprising a mineral-insulated cable (10) containing thermocouple wires (12), characterized in that the mineral-insulated cable (10) is sealed at a cold-end part (13) by a sealing device (16) according to any of the preceding claims and wherein the thermocouple wires (12) are connected to an electronic temperature measuring circuit (33) over a respective electric conducting element (41), wherein the measuring circuit (33) is designed to determine an absolute temperature of the cold-end part (13) by measuring an electric property and/or electric quantity of an electric temperature sensing element (T) of the sealing device (16).

In some embodiments, the circuit (33) comprises a switching element (44) for alternatingly determining the temperature of the cold-end part (13) and a temperature of a hot-end part of the mineral-insulated cable (10).

In some embodiments, the measuring circuit (33) is designed to provide a supply voltage for the thermocouple wires (12) and to modulate the supply voltage by means of a measuring voltage for the temperature sensing element (T).

In some embodiments, the measuring circuit (33) is designed to provide a supply current (I) for the temperature sensing element (T) and measure a resulting voltage (U) over the temperature sensing element (T) and to determine the temperature of the cold-end part (13) as a function of the measured resulting voltage (U).

BRIEF DESCRIPTION OF THE DRAWINGS

In the figures and the description, various implementations of the teachings herein are described. The figures show.

DETAILED DESCRIPTION

The teachings of the present include sealing devices for hermetic sealing a cold end or a cold-end part of a thermocouple wire arrangement that is based on a mineral-insulated cable. In some embodiments, the sealing device comprises a sealing element made of or containing an electrically insulating material. The sealing element can have the shape of a plate or a flat cylinder. The electrically insulating material can be, e.g., ceramics or glass. The sealing element comprises a respective through-hole for passing through a respective thermocouple wire of the mineral-insulated cable. A sealing ring that comprises metal or an alloy is arranged at an outer rim of the sealing element for fixing the sealing element to a sheath or a support tube of the mineral-insulated cable. As the sealing ring is made of metal or an alloy, the sealing ring may be fixed to the sheath or the support tube by soldering or welding. In other words, for sealing the mineral-insulated cable, the sealing element may be placed over the cold-end part of the thermocouple mineral-insulated cable such that the thermocouple wires are each passed through one individual through-hole of the sealing element. The sealing element may then be arranged at the end of the sheath or the support tube. There it may be fixed by soldering or welding the sealing ring to the sheath or the support tube. This provides for a gas-tight, hermetic sealing.

In some embodiments, the sealing device comprises an electric temperature sensing element for sensing an absolute temperature of the sealing device and thus the cold-end part. The temperature sensing element comprises an electric property that is temperature-dependent. In other words, the value of the electric property is a function of the temperature. By arranging the sealing device at the cold-end part of the thermocouple mineral-insulated cable, an electric temperature sensing element is thus implicitly arranged at the cold-end part.

In some embodiments, no extension cable is needed for extending the thermocouple wires from the mineral-insulated cable to the electronic temperature measuring circuit. As the electric temperature sensing element is arranged directly at the cold-end part of the thermocouple mineral-insulated cable, the absolute temperature value can be measured at the cold-end part.

In some embodiments, the temperature sensing element comprises a resistance sensor. The electrical property that can be evaluated for sensing the absolute temperature can be the resistance value.

In some embodiments, temperatures higher than 500° C. can be measured. The resistance sensor can be, e.g., an NTC resistor (NTC—negative temperature coefficient) or a PTC resistor (PTC—positive temperature coefficient) or a P100 resistor.

In some embodiments, the temperature sensing element comprises an inductive temperature sensor and/or a capacitive temperature sensor. The electrical property that can be evaluated for sensing the absolute temperature can be the inductance value for the inductive temperature sensor and the capacitance value for the capacitive temperature sensor. Using an inductive temperature sensor allows it to be connected in series to one of the thermocouple wires such that no additional connecting wire is needed. Using a capacitive temperature sensor allows it to be run at a frequency of an AC voltage (AC—alternating current) that can be superimposed to the voltage generated by the thermocouple wires at the cold-end part. In some embodiments, the inductive temperature sensor can be, e.g., a choke or an electric coil. The capacitive temperature sensor can be, e.g., a capacitor.

In some embodiments, the temperature sensing element is integrated into the sealing element. In other words, the temperature sensing element is surrounded by a material of the sealing element. This provides for a mechanical protection of the temperature sensing element.

In some embodiments, the temperature sensing element is attached to the sealing element. In other words, the temperature sensing element is arranged at or fixed to a surface of the sealing element. This provides for that the temperature sensing element may be installed later, after the sealing element has been produced. The sealing element and the temperature sensing element may thus be produced independently from each other.

In some embodiments, the temperature sensing element comprises two electrical contacts (e.g. for plus and minus polarity), wherein one of the contacts is electrically connected to one of the thermocouple wires of the mineral-insulated cable and the other contact is electrically connected to one separate electrical connecting element. This is also referred to as the single-wire connection. The electrical connecting element is different from any of the thermocouple wires of the mineral-insulated cable. This provides that only one additional electrical connecting element is needed for connecting the mineral-insulated cable to the electronic measuring circuit for sensing the absolute temperature. The connecting element can be a wire, e.g. a copper wire or an iron wire.

In some embodiments, the temperature sensing element is connected in series to one of the thermocouple wires of the mineral-insulated cable and a connecting element (e.g. a wire) for connecting the mineral-insulated cable to the electronic measuring circuit. In other words, the temperature sensing element is connected to one of the thermocouple wires of the mineral-insulated cable and the connecting element is connected to the thermocouple wire over the sensor element. This provides for the advantage that no additional wire for connecting the temperature sensing is needed. This is also referred to as the inline or zero-wire connection. The connecting element for connecting the thermocouple wire to the measuring circuit can be a copper wire or an iron wire.

In some embodiments, the temperature sensing element comprises two electrical contacts (e.g. for plus and minus polarity), wherein the temperature sensing element is connected to a four-wire connection which provides two wires at each of the electrical contact of the temperature sensing element. In other words, at each end of the contacts of the temperature sensing element two wires are provided, one for conducting a sensing current and one for measuring the resulting voltage. This reduces the influence of the local resistance of the contact points where the sensing current enters and leaves the wires.

In some embodiments, the electrically insulating material of the sealing element comprises glass or ceramics. The sealing element thus provides a high melting point over 400° C. The sealing element is also mechanically stiff for holding the temperature sensing element fixed at a high temperature greater than 400° C.

In some embodiments, the sealing element provides sealing surfaces or sealing areas in each through-hole. The sealing areas provide a surface made of a metal or an alloy. A thermocouple wire arranged in such a through-hold may therefore be connected to the sealing element by means of soldering or welding. This allows for a hermetic or gas-tight sealing. The said sealing ring also provides sealing surfaces or sealing areas with a surface made of a metal or an alloy. The sealing element may therefore hermetically seal the mineral-insulated cable by soldering or welding the sealing ring to the sheath or the support tube of the mineral-insulated cable. The hermetic or gas-tight sealing protects the mineral powder of the mineral-insulated cable against water and moisture.

As another example, some embodiments include a thermocouple temperature sensing device that comprises a mineral-insulated cable that comprises thermocouple wires. The mineral-insulated cable is sealed at a cold-end part by a sealing device incorporating the teachings herein. The thermocouple wires are connected to an electronic temperature measuring circuit over a respective electric conducting element, e.g. a wire. The conductive elements for the thermocouple wires can be of the same material, e.g. copper or iron.

The measuring circuit determines an absolute temperature of the cold-end part by measuring an electric property and/or electric quantity of an electric temperature sensing element of the sealing device. An electric property can be the resistance and/or the inductance and/or the capacitance. An electric quantity can be an electric current and/or an electric voltage. The thermocouple temperature sensing device provides the advantage that no thermocouple extension cable is needed for connecting the mineral-insulated cable to the measuring circuit. The measurement of the absolute temperature takes place at the cold-end part by means of the temperature sensing element of the sealing device. The electronic temperature measuring circuit may comprise a microcontroller. The measuring circuit may determine the value of the at least one electric property and/or electric quantity and it may determine a value for the absolute temperature on the basis of a function that relates the at least one value of the electric property and/or the electric quantity to a value of the absolute temperature. The function can be designed as a look-up table.

In some embodiments, the measuring circuit comprises a switch or switching element for alternatingly determining the temperature of the cold-end part (absolute temperature) and a temperature of a hot-end part of the mineral-insulated cable (relative temperature). This reduces interference between the two measurements. The switching element can be based on at least one transistor.

In some embodiments, the measuring circuit is designed to provide a supply voltage for the thermocouple wires and to modulate the measurement voltage by means of a sensing voltage for the temperature sensing element. The measurement voltage can be, e.g., a DC-voltage (DC—durating current). With this embodiment the temperature of the hot-end part and the cold-end part of the thermocouple mineral-insulated cable can be measured at the same time.

In some embodiments, the measuring circuit is designed to provide a supply current for the temperature sensing element and measure a voltage U resulting over the temperature sensing element and to determine the temperature of the cold-end part as a function of the measured resulting voltage U. The resulting voltage U can be measured by connecting the temperature sensing element to the measuring circuit by means of at least one conducting element, e.g. at least on wire, that can be made of copper or iron.

In the description that follows, the described components of the embodiment each represent individual features of the teachings herein which are to be considered independently of each other and which each develop the teachings also independently of each other and thereby are also to be regarded as a component of the teachings in individual manner or in another than the shown combination. Furthermore, the described embodiment can also be supplemented by further features already described. In the figures elements that provide the same function are marked with identical reference signs.

Figure 1:
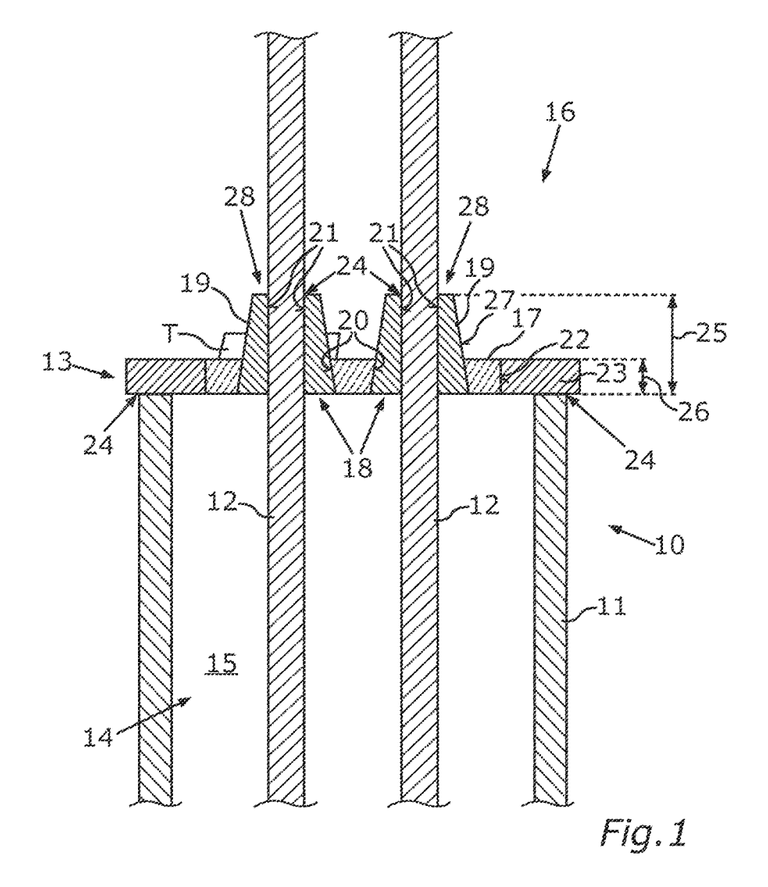
FIG. 1 a schematic illustration of an example embodiment of the mineral-insulated cable incorporating teachings of the present disclosure.

FIG. 1 shows a mineral-insulated cable 10 that can serve as a thermocouple element for measuring a temperature at a hot-end part (not shown) of the mineral-insulated cable. The cable 10 can comprise an outer sheath 11 that can be made of a metal or an alloy. The sheath 11 can be made of, e.g., steel or Inconel®. The sheath 11 can have the shape of a tube. Inside the sheath 11, wires 12 can be arranged that may constitute a thermocouple. At the hot-end part, the wires 12 can be electrically connected, e.g. by soldering the wires 12 together.

At end 13 of sheath 11, which serves as the cold-end part of the thermocouple element, the wires 12 protrude out of the sheath 11. Thus, the wires 12 can be connected to electrical connecting elements (not shown) for connecting the thermocouple element to an electronic measuring circuit. The wire 12 can be of different material. For example, one of the wires 12 by be made of NiSi and the other of the wires 12 of NiCrSi. A space 14 between wires 12 and sheath 11 is filled with an insulating mineral 15. The mineral 15 can be provided in the form of a powder. The mineral 15 can be, e.g., aluminum oxide or magnesium oxide.

Figure 2:
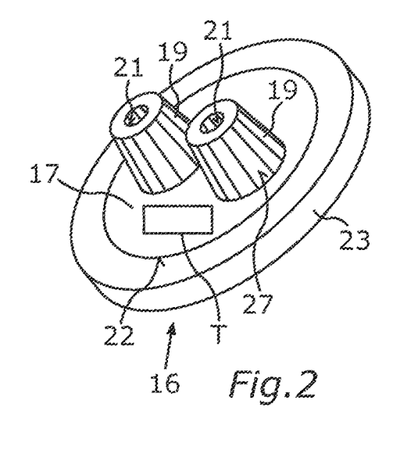
FIG. 2 a schematic illustration of a sealing device provided in the cable of FIG. 1 incorporating teachings of the present disclosure.

In order to seal hermetically the end 13 in order to protect the mineral 15 against humidity, a sealing device 16 is fixed to the end 13. The sealing device 16 alone is shown in FIG. 2. The sealing device 16 comprises a sealing element in the form of a sealing plate 17 for covering or closing or sealing the open end 13 of sheath 11. The sealing plate 17 can be made of glass or ceramics. For each wire 12 the sealing plate 17 provides a through-hole 18. In or at each through-hole 18 a ring element 19 can be arranged or provided that can be attached, e.g., to an inner rim 20 of each through-hole 18. The inner rim 20 represents an edge of the through-hole 18. Each ring element 19 is of the basic shape of a hollow cylinder through which the protruding end of the wire 12 can be pushed or stuck. Inside each ring element 19 a contact surface 21 is provided. Each ring element 19 can be made of nickel or nickel silicone or nickel chrome silicone or another alloy that is compatible to wire 12 with regards to CTE (coefficient of thermal extension) and their electrical compatibility. The compatibility can be found in simple experiments and depends on the planned operational conditions of the cable 10. The contact surface 21 allows for producing a mechanical bonding between the ring element 19 and the wire 12 inside ring element 19. For example, the wire 12 and the ring element 19 can be welded or soldered or brazed together. The contact surfaces 21 are therefore sealing areas.

An outer rim 22 of the sealing plate 17 can be surrounded by a sealing ring 23. The sealing ring 23 can comprise a metal and/or an alloy. The sealing ring 23 can be fixed to the sheath 11 by means of a mechanical bonding 24 similar to the mechanical bonding 24 of the wire and the ring element 19. For example, the sealing ring 23 can be welded or brazed or soldered to the sheath 11. The sealing ring 23 therefore provides a further sealing area. The mechanical bonding 24 provides a watertight sealing such that no humidity and/or gas can intrude the sheath 11 and reach the mineral 15. The sealing device 16 may therefore hermetically seal the end 13 of mineral insulated cable 10.

The ring elements 19 can be of the shape of a tube with a length 25 greater than a thickness 26 of the sealing plate 17. Thus the ring elements 19 provide a support tube for the end of the wire 12. Further, an outer surface 27 of each ring element 19 can be cone shaped thus that the mechanical bonding 24 between the wire 12 and the ring element 19 can be produced by welding or soldering or brazing with less heat energy at a far end 28 of the ring element 19 with regard to sealing plate 17.

Sealing device 16 can also comprise a temperature sensing element T. The sensing element T can be attached to a surface of the sealing plate 17 or the sensing element T can be partly or fully integrated into the material of sealing plate 17.

The temperature sensing element T can comprise an electrical property that is temperature-dependent. In other words, a value of the electrical property is a function of the absolute temperature of the sensing element. By measuring the electrical property or an electrical quantity that depends on the electrical property, the absolute temperature of the sensing element T can be measured. The sensing element T can be or comprise a resistance sensor (e.g., NTC or PTC) and/or an inductive temperature sensor (e.g. a choke) and/or a capacitive temperature sensor (e.g. a capacitor).

Figure 3:
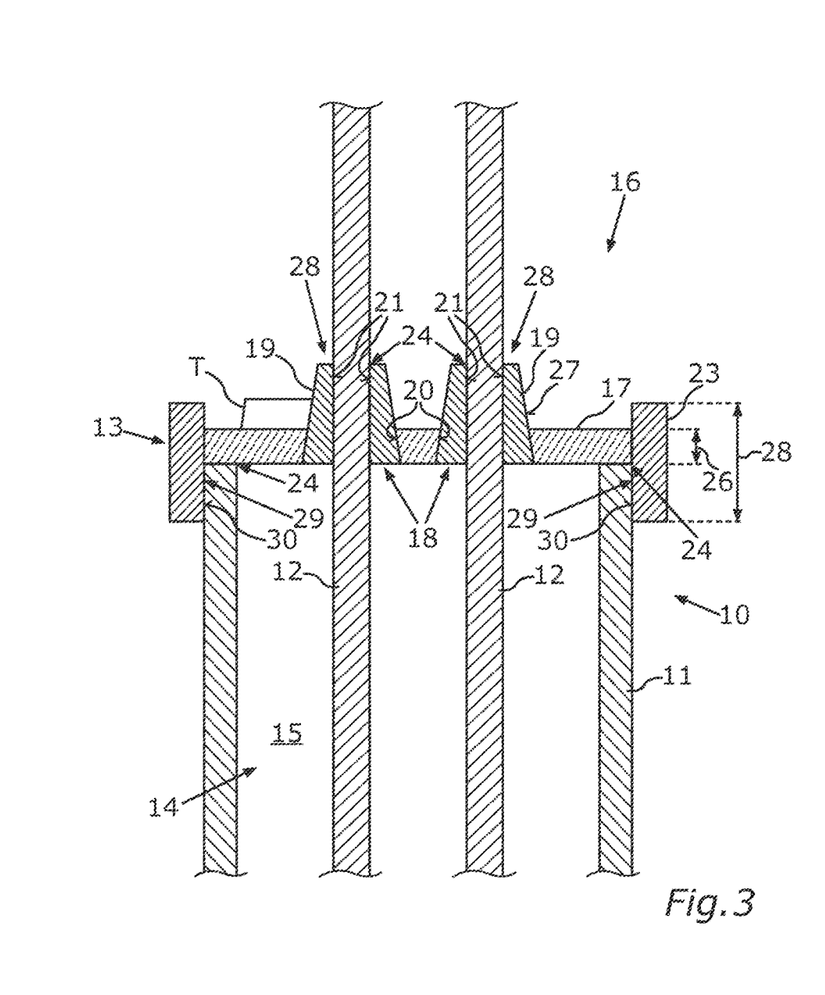
FIG. 3 a schematic illustration of another embodiment of the cable incorporating teachings of the present disclosure.

FIG. 3 shows a mineral-insulated cable 16 that is built in a comparable way with regard to the mineral-insulated cable of FIG. 1. For this reason, only the elements that differ are explained.

Figure 4:
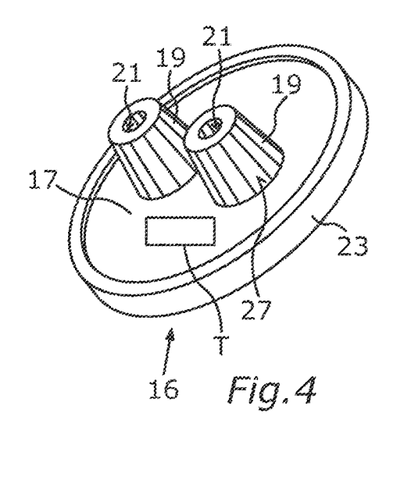
FIG. 4 a schematic illustration of a sealing device provided in the cable of FIG. 3 incorporating teachings of the present disclosure.

The cable 10 shown in FIG. 3 and the corresponding sealing device 16 shown in FIG. 4 differ from the embodiment shown in FIG. 1 and FIG. 2 in that a length or thickness 28 of the sealing ring 23 is larger or greater than the thickness 26 of the sealing plate 17. Thus, a collar 29 is provided by sealing ring 23 such that the end 13 of sheath 11 is supported or covered or surrounded by the collar 29. The mechanical bonding 24 between sheath 11 and sealing ring can be made more robust as a larger contact surface 30 is available as compared to the embodiment of FIG. 1 and FIG. 2.

The sealing device 16 can also comprise a temperature sensing element T. The sensing element T can be attached to a surface of the sealing plate 17 or the sensing element T can be partly or fully integrated into the material of sealing plate 17. The sensing element T can be of the same type as described in connection with FIG. 1 and FIG. 2.

Figure 5:
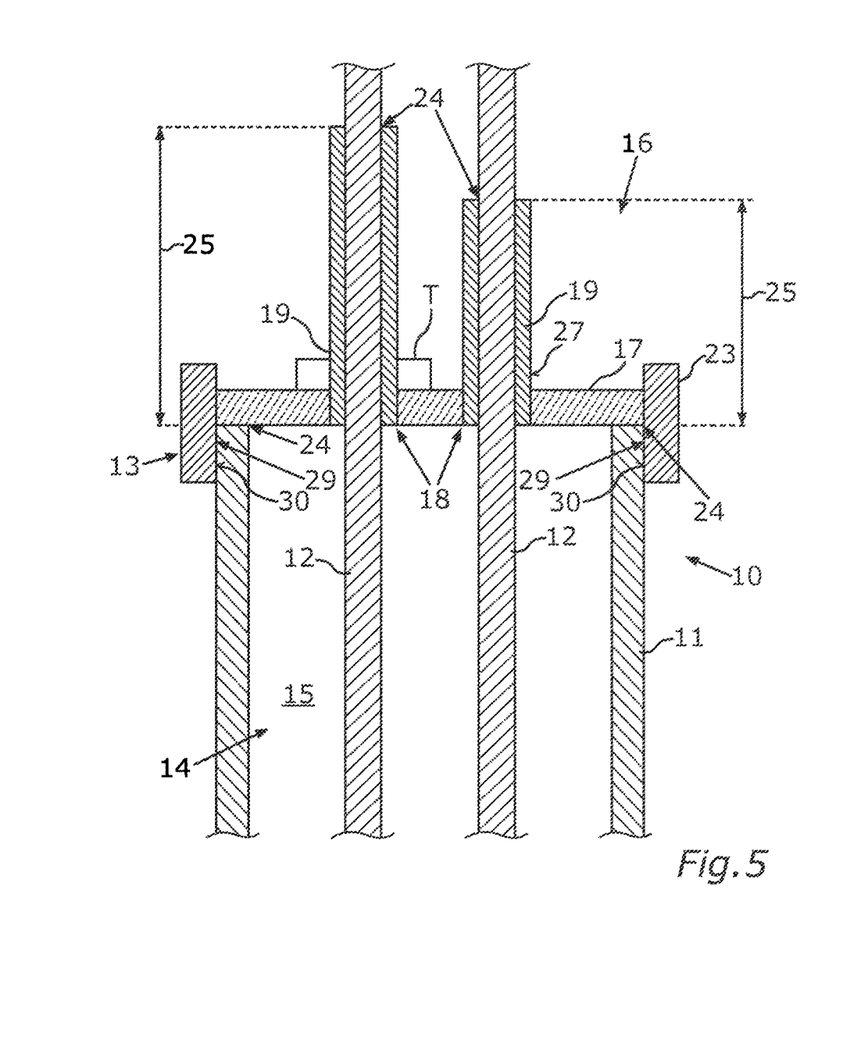
FIG. 5 a schematic illustration of another embodiment of the cable incorporating teachings of the present disclosure.
Figure 6:
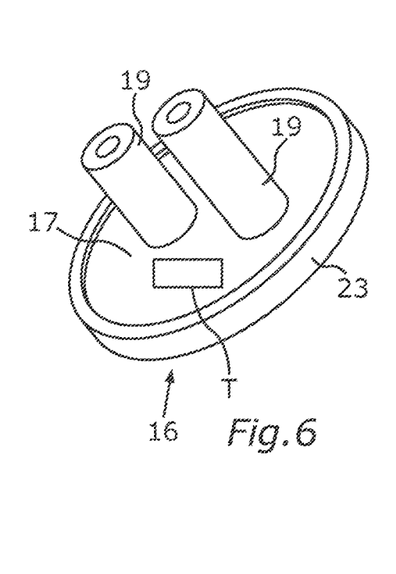
FIG. 6 a schematic illustration of a sealing device provided in the cable of FIG. 5 incorporating teachings of the present disclosure.

In FIG. 5 a mineral-insulated cable 10 is shown that is based on the embodiment of FIG. 3. The sealing device 16 of the cable 10 of FIG. 5 is shown in FIG. 6. The difference between the embodiments of FIG. 5 and FIG. 6 on one side and FIG. 3 and FIG. 4 on the other side is that the ring elements 19 are provided as tubes with different length 25 in the embodiment of FIG. 5 and FIG. 6.

The sealing device 16 can also comprise a temperature sensing element T. The sensing element T can be attached to a surface of the sealing plate 17 or the sensing element T can be partly or fully integrated into the material of sealing plate 17. The sensing element T can be of the same type as described in connection with FIG. 1 and FIG. 2.

Figure 7:
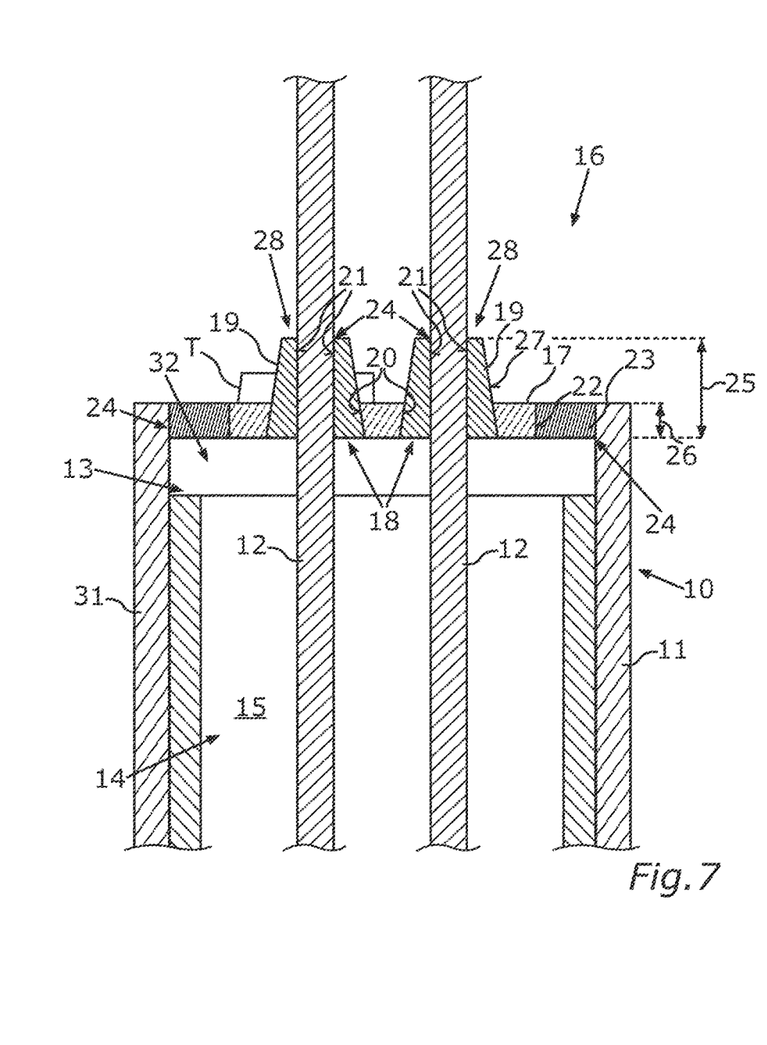
FIG. 7 a schematic illustration of another embodiment of the cable with a support tube incorporating teachings of the present disclosure.
Figure 8:
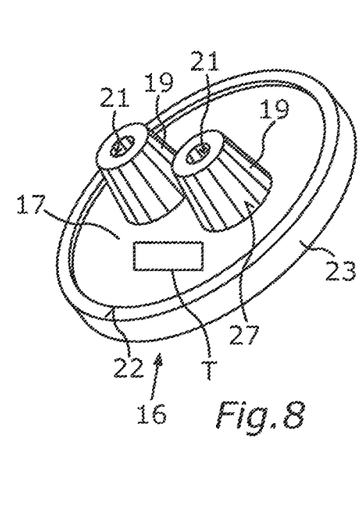
FIG. 8 a schematic illustration of a sealing device provided in the cable of FIG. 7 incorporating teachings of the present disclosure.

FIG. 7 illustrates a cable with a support tube 31 for mechanically supporting the sheath 11. The sheath 11 is arranged inside the support tube 31. The support tube 31 and the sheath 11 may be provided as two coaxially arranged cylinders that touch each other. A sealing device 16 may be fixed or connected to the support tube 31 in the already described manner. The sealing device 16 may be arranged at a distance to sheath 11 such that a gap or free space or cavity 32 is provided between the sealing device 16 on one side and the end 13 of the sheath 11 on the other side. FIG. 8 shows the sealing device 16 used for the cable 10 of FIG. 7.

The sealing device 16 can also comprise a temperature sensing element T. The sensing element T can be attached to a surface of the sealing plate 17 or the sensing element T can be partly or fully integrated into the material of sealing plate 17. The sensing element T can be of the same type as described in connection with FIG. 1 and FIG. 2.

Thus, the mineral-insulated cable 10 as shown in FIG. 1, FIG. 3 and FIG. 5 can be sealed at a cold-part open end 13 by means of a sealing device 16 according to FIG. 2, FIG. 4, FIG. 6 and FIG. 8. Each sealing device 16 is a termination element that consists of one external sealing ring 23 with the same dimensions as the end 13 of the cable or sheath 11 or the support tube 31 and with two tubes as ring elements 19 to pass wires or conductors going through. The elements can be welded or soldered to fix the sealing device 16 to the wires 12 and the sheath 11.

This provides a simple way to seal a mineral-insulated cable by an extension part that can be manufactured independently and can be provided as ready-made or pre-manufactured part. A further advantage is that by choosing the material of the ring elements 19 and of the sealing ring 23, CTEs can be adapted to the materials used for the wires 12 and the sheath 11. Moreover, as no melting of sealing material (like glass or ceramics) is needed close to the mineral powder (like magnesium oxide) of the mineral-insulated cable, no gas evaporates from the mineral powder which would result in bubbles inside the molten sealing material.

By providing a temperature sensing element T, the absolute temperature of the cold-end part (end 13) of the mineral-insulated cable can be measured. Together with sensing the voltage difference or electromagnetic force emf between the wires 12, which provides a value for the relative temperature between the cold-end part and the hot-end part of the mineral insulated cable 10, the absolute temperature of the hot-end part can be determined. Thus, there is no need to use a thermocouple extension cable for connecting the wires 12 to an electronic measuring circuit.

Figure 9:
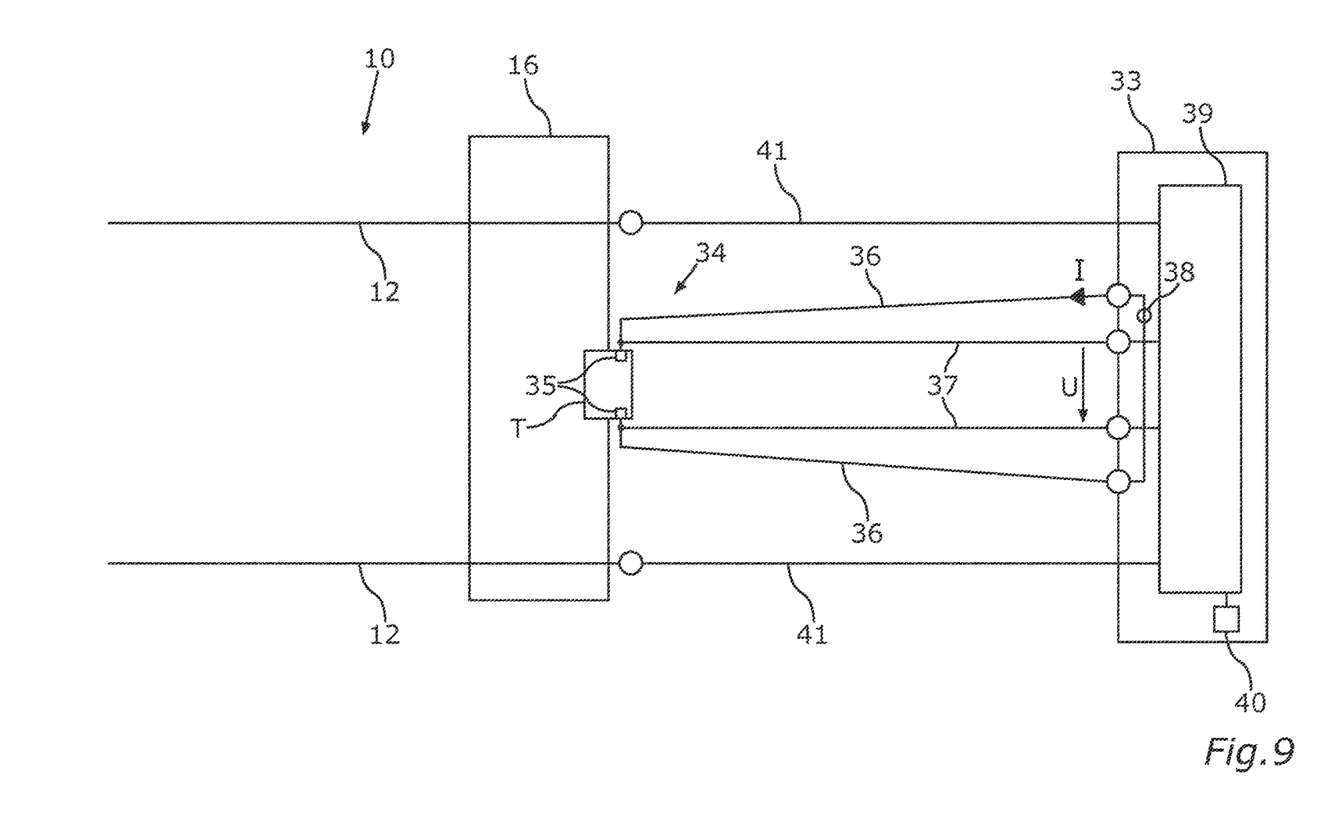
FIG. 9 a schematic illustration of a thermocouple temperature sensing device incorporating teachings of the present disclosure, the device comprising a four-wire connection for a temperature sensing element.
Figure 10:
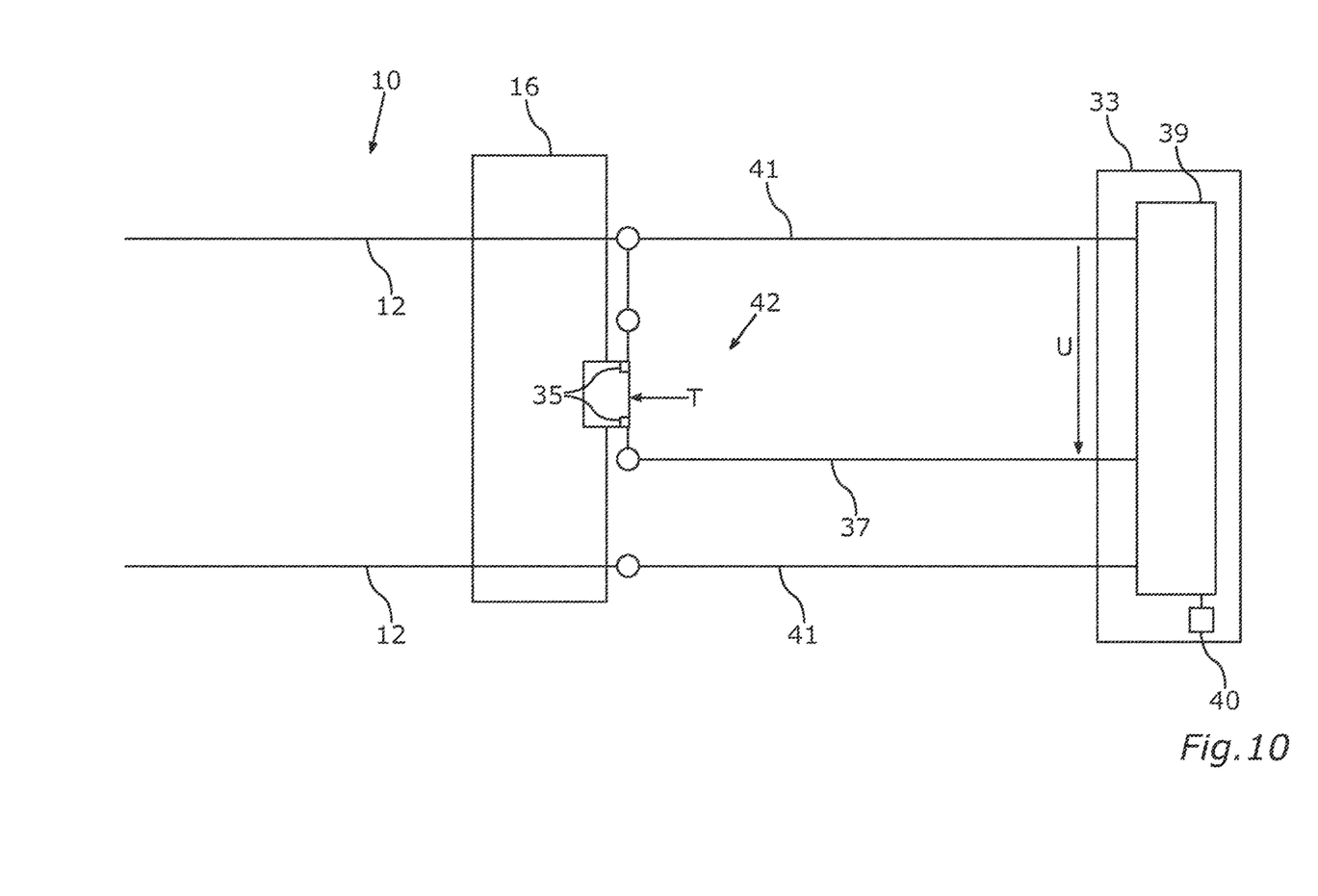
FIG. 10 a schematic illustration of a thermocouple temperature sensing device incorporating teachings of the present disclosure, the device comprising a single-wire connection for the temperature sensing element.
Figure 11:
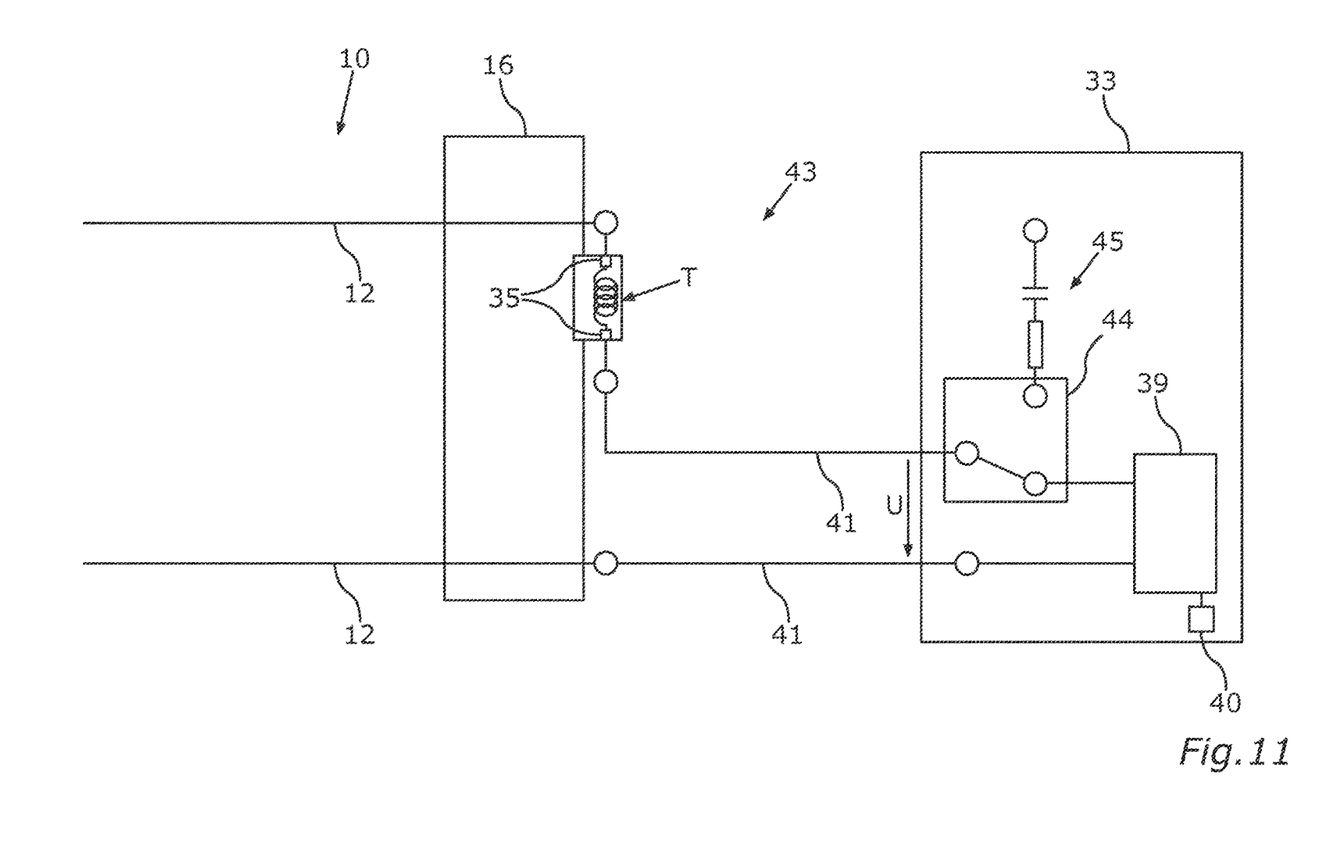
FIG. 11 a schematic illustration of a thermocouple temperature sensing device incorporating teachings of the present disclosure, the device comprising an inline connection or zero-wire connection for the temperature sensing element.

FIG. 9, FIG. 10, and FIG. 11 illustrate, how the wires 12 and the temperature sensing element T may be electrically connected to an electronic temperature measuring circuit 33. FIG. 9 illustrates a four-wire connection 34 for connecting the temperature sensing element T to the electronic measuring circuit 33. The sensing element T may comprise 2 electrical contacts 35 to each of which to wires 36, 37 can be connected. A current source 38 may drive a sensing current I through wires 36. An electric voltage U can be measured between wires 37. The voltage U is a function of the absolute temperature of sensing element T. The voltage U can be received by an analog-digital-converter 39 of measuring circuit 33 a microcontroller 40 may evaluate the received voltage value of voltage U. Temperature sensing element T can be, e.g., an NTC or a PT 100 resistor. The wires 36, 37 can be wires made of copper or iron. The wires 36, 37 can be of the same material. The thermocouple wires 12 of the mineral-insulated cable 10 can be connected to measuring circuit 33 by wires 41. The wires 41 for each wire 12 can all be of the same material, e.g., copper or iron. Generally, wires 41 do not need to provide thermocouple properties.

FIG. 10 illustrates a 1-wire connection 42 of temperature sensing element T with the measuring circuit 33. In other words, only one additional wire 37 is used for measuring voltage U. One of the wires 41 that is used for connecting the thermocouple wires 12 to the measuring circuit 33 is used as a second wire. The temperature sensing element T can be, e.g., an NTC resistor or a PT 100 resistor.

FIG. 11 illustrates a 0-wire connection, which means, that the temperature sensing element T is connected to the measuring circuit 33 by the same wires 41 that are also used for connecting the thermocouple wires 12 to the measuring circuit 33. The temperature sensing element T used for this connection 43 can be, e.g., an inductance temperature sensor. Measuring circuit 33 may comprise a switching element 44 for switching between the measurement of voltage U and the measurement of the voltage or electromagnetic force generated by the thermocouple wires 12. For measuring the voltage U, a driving circuit 45 may be used for creating a resonance effect at a resonant frequency that depends on the inductance a value of sensing element T and a capacitor C and a resistor R of a driving circuit 45. The measurement of voltage U for deriving the absolute temperature of sensing element T is therefore performed at a different frequency than the measurement of the voltage difference between the thermocouple wires 12.

Thus, the temperature measurement is possible at the thermocouple cold-end on the basis of sealing device 16. This avoids the usage of expensive extension thermocouple wires for connecting wires 12 to the measuring circuit 33. Additionally, sealing device 16 provides a simple way to seal hermetically the mineral-insulated cable. By choosing the materials, different CTEs can be considered. Overall, the examples show how the teachings herein provide a mineral insulated cable sealing by a termination part with glass or ceramics and with an integrated temperature sensor.

What is claimed is:

1. A sealing device for sealing a cold-end part of a a mineral-insulated cable, the sealing device comprising:
   a sealing element including an electrically insulating material, the sealing element defining a through-hole for allowing a first thermocouple wire to pass therethrough;
   a sealing ring arranged at an outer rim of the sealing element for fixing the sealing device to a sheath or a support tube of the mineral-insulated cable; and
   an electric temperature sensing element for sensing an absolute temperature of the cold-end part;
   wherein the temperature sensing element has at least one temperature-dependent electrical property.

2. A sealing device according to claim 1, wherein the temperature sensing element comprises a resistance sensor.

3. A sealing device according to claim 1, wherein the temperature sensing element comprises an inductive temperature sensor and/or a capacitive temperature sensor.

4. A sealing device according to claim 1, wherein the temperature sensing element is integrated into the sealing element.

5. A sealing device according to claim 1, wherein the temperature sensing element is attached to the sealing element.

6. A sealing device according to claim 1, wherein the temperature sensing element comprises two electrical contacts; and
wherein one of the two contacts is electrically connectable to the first thermocouple wire; and
the other contact of the two contacts is electrically connected to a separate electrical connecting element different from any thermocouple wires of the mineral-insulated cable.

7. A sealing device according to claim 1, further comprising a connecting element for connecting the first thermocouple wire to an electronic measuring circuit connected to a second thermocouple wire over the sensor element.

8. A sealing device according to claim 1, wherein the temperature sensing element comprises two electrical contacts; and
wherein the temperature sensing element is connected to a four-wire connection with two wires per electrical contact of the temperature sensing element.

9. A sealing device according to claim 1, wherein the electrically insulating material comprises a glass or a ceramic.

10. A sealing device according to claim 1, wherein:
the sealing element defines multiple sealing areas at multiple respective through-holes and at the sealing ring for hermetically sealing the mineral-insulated cable by soldering or welding the sealing device to each of multiple thermocouple wires and the sheath or the support tube of the mineral-insulated cable; and
the sealing areas each include a surface comprising a metal.

11. A thermocouple temperature sensing device comprising:
a mineral-insulated cable including multiple thermocouple wires;
a sealing device sealing the mineral-insulated cable at a cold-end part;
the sealing device comprising:
a sealing element including an electrically insulating material, the sealing element defining a through-hole allowing a first thermocouple wire to pass therethrough;
a sealing ring arranged at an outer rim of the sealing element for fixing the sealing device to a sheath or a support tube of the mineral-insulated cable; and
an electric temperature sensing element for sensing an absolute temperature of the cold-end part;
wherein the temperature sensing element has at least one temperature-dependent electrical property; and
an electronic temperature measuring circuit connected to the multiple thermocouple wires over a respective electric conducting element;
wherein the measuring circuit determines an absolute temperature of the cold-end part by measuring an electric property and/or electric quantity of an electric temperature sensing element.

12. A thermocouple temperature sensing device according to claim 11, wherein the measuring circuit comprises a switching element for alternatingly determining the temperature of the cold-end part and a temperature of a hot-end part of the mineral-insulated cable.

13. A thermocouple temperature sensing device according to claim 11, wherein the measuring circuit provides a supply voltage for the thermocouple wires and modulates the supply voltage using a measuring voltage for the temperature sensing element.

14. A thermocouple temperature sensing device according to claim 11, wherein the measuring circuit:
provides a supply current for the temperature sensing element;
measures a resulting voltage over the temperature sensing element; and
determines the temperature of the cold-end part as a function of the measured resulting voltage.

* * * * *